United States Patent [19]

Shofner

[11] Patent Number: 4,881,957
[45] Date of Patent: Nov. 21, 1989

[54] AIR FILTRATION UNITS AND METHODS EMPLOYING DUST AS FILTRATION MEDIA AND AIR FLOW RATE AS A DIRECTLY CONTROLLED PARAMETER

[75] Inventor: Frederick M. Shofner, Knoxville, Tenn.

[73] Assignee: PPM, Inc., Knoxville, Tenn.

[21] Appl. No.: 482,604

[22] Filed: Apr. 6, 1983

[51] Int. Cl.⁴ .................. B01D 33/00; B01D 41/00
[52] U.S. Cl. .................................... 55/97; 55/283; 55/352
[58] Field of Search ............... 55/18, 21, 96, 97, 283, 55/352, 354, 385 A, 413, 414

[56] References Cited

U.S. PATENT DOCUMENTS

| | | | |
|---|---|---|---|
| 2,763,139 | 9/1956 | Callan et al. | 55/354 |
| 3,010,179 | 11/1961 | Thal | 26/2 R |
| 3,152,381 | 10/1964 | Priester, Jr. et al. | 26/2 R |
| 3,596,442 | 8/1971 | Neumann | 55/354 |
| 3,745,750 | 7/1973 | Arff | 55/413 |
| 4,011,067 | 3/1977 | Carey, Jr. | 55/354 |
| 4,226,715 | 10/1980 | Niederer et al. | 55/352 |
| 4,277,255 | 7/1981 | Apelgren | 55/21 |
| 4,370,155 | 1/1983 | Armbruster | 55/414 |
| 4,378,080 | 4/1983 | Long | 55/354 |
| 4,461,633 | 7/1984 | Bodovsky | 55/283 |

FOREIGN PATENT DOCUMENTS

| | | | |
|---|---|---|---|
| 2717613 | 11/1977 | Fed. Rep. of Germany | 55/385 A |
| 2800703 | 7/1978 | Fed. Rep. of Germany | 55/354 |
| 939098 | 6/1982 | U.S.S.R. | 55/283 |

OTHER PUBLICATIONS

Modofil® Sales Brochures Nos. 107–10/82, (Oct. 1982), 112–2/83, (Feb. 1983), and 113–3/83, (Mar. 1983), prepared by Assignee, PPM, Inc., Knoxville, TN.

J. H. Hanley, and F. M. Shofner, Application of Modular Filtration to Cost-Effective Cotton Dust Control in Textile Processes; Especially in Spinning Through Warping, Paper Presented at Proceeding of The Seventh Cotton Dust Research Conferences, San Antonio, TX, Jan. 3–4, 1983.

F. M. Shofner et al., "Electro-Optical, Isokinetic Sampling of Microdust in Process Air Flows", FIG. 6 and p. 18, Nov. 1–6, 1981, Reprinted in "Aersols in the Mining and Industrial Work Environment", vol. 3, chap. 81, pp. 1205–1222, Ann Arbor Science Publishers, (1983).

F. M. Shofner et al., "Measurement and Control of Non-Cotton Dust Contributions in the Cotton Processing Workplace"; I-$x_{at}$, Oct. 7–8, 1980.

Sales Brochures, Northern Air Corporation, "Modular Air Filtration Systems Model AR-2000" (exact date unknown).

*Primary Examiner*—Kenneth M. Schor
*Attorney, Agent, or Firm*—Kerkam, Stowell, Kondracki & Clarke

[57] ABSTRACT

Air filtration systems and methods which intentionally use collected dust to enhance air filtration performance, use air flow rate control to optimally maintain electromechanical efficiency and media permeability, use high velocity discharge to "throw" clean air to preferable workplace areas, and use a cylindrical drum design for pleasing appearance and practical features. The systems and methods are particularly applicable as modular filtration units to textile processing environments, but are suitable for more general applications as well.

12 Claims, 8 Drawing Sheets

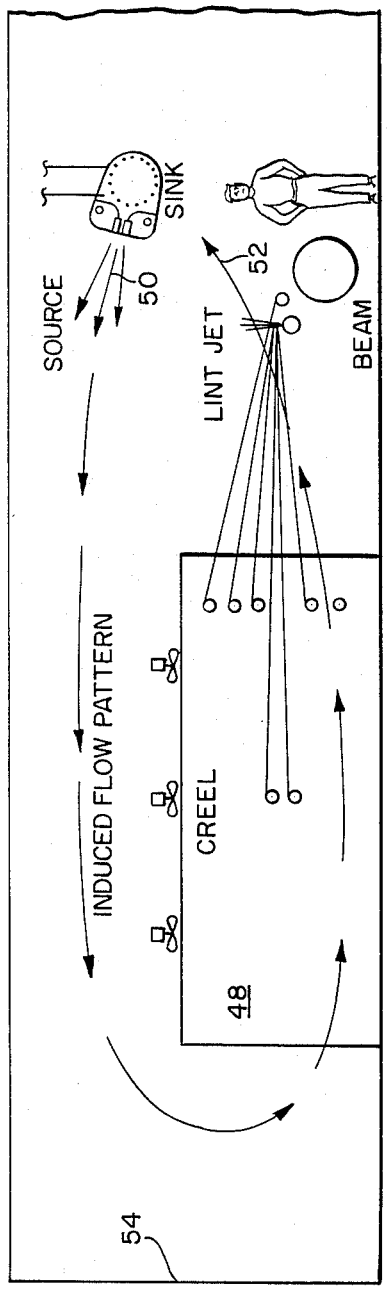
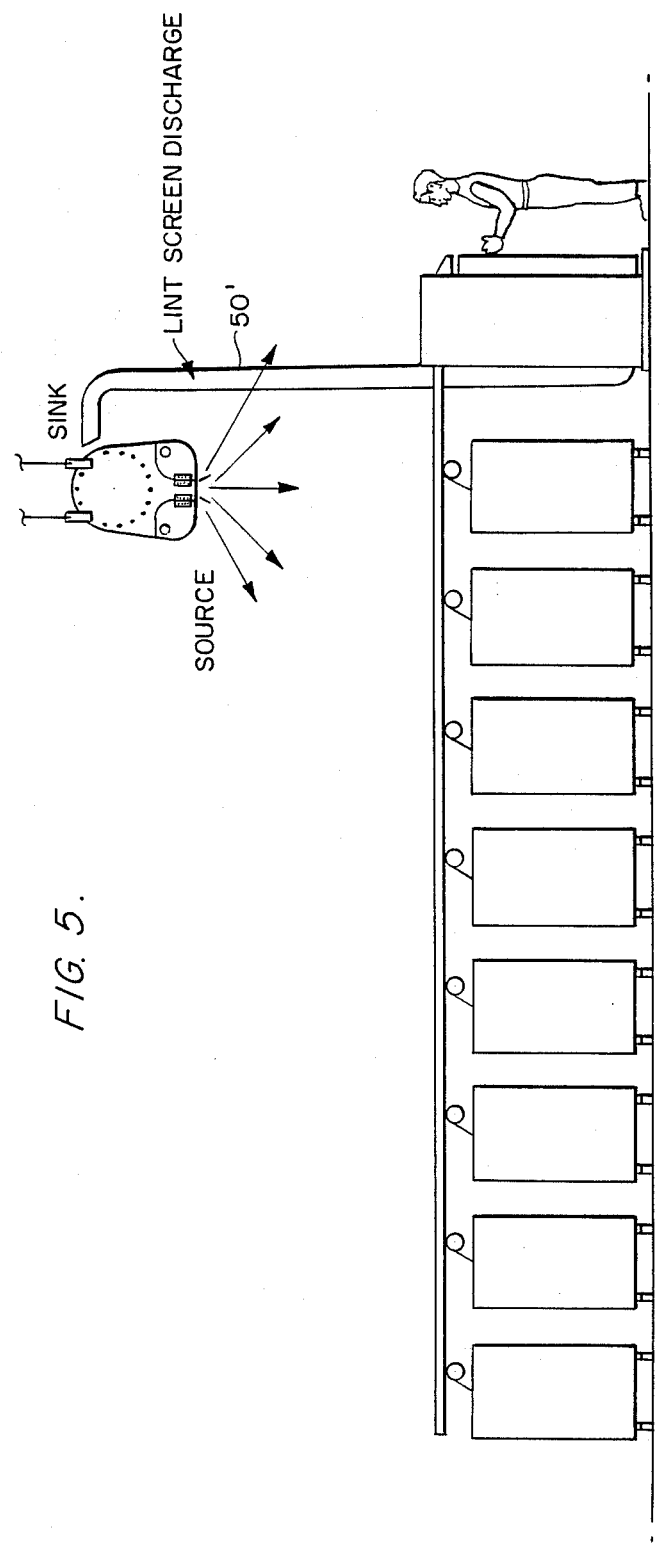

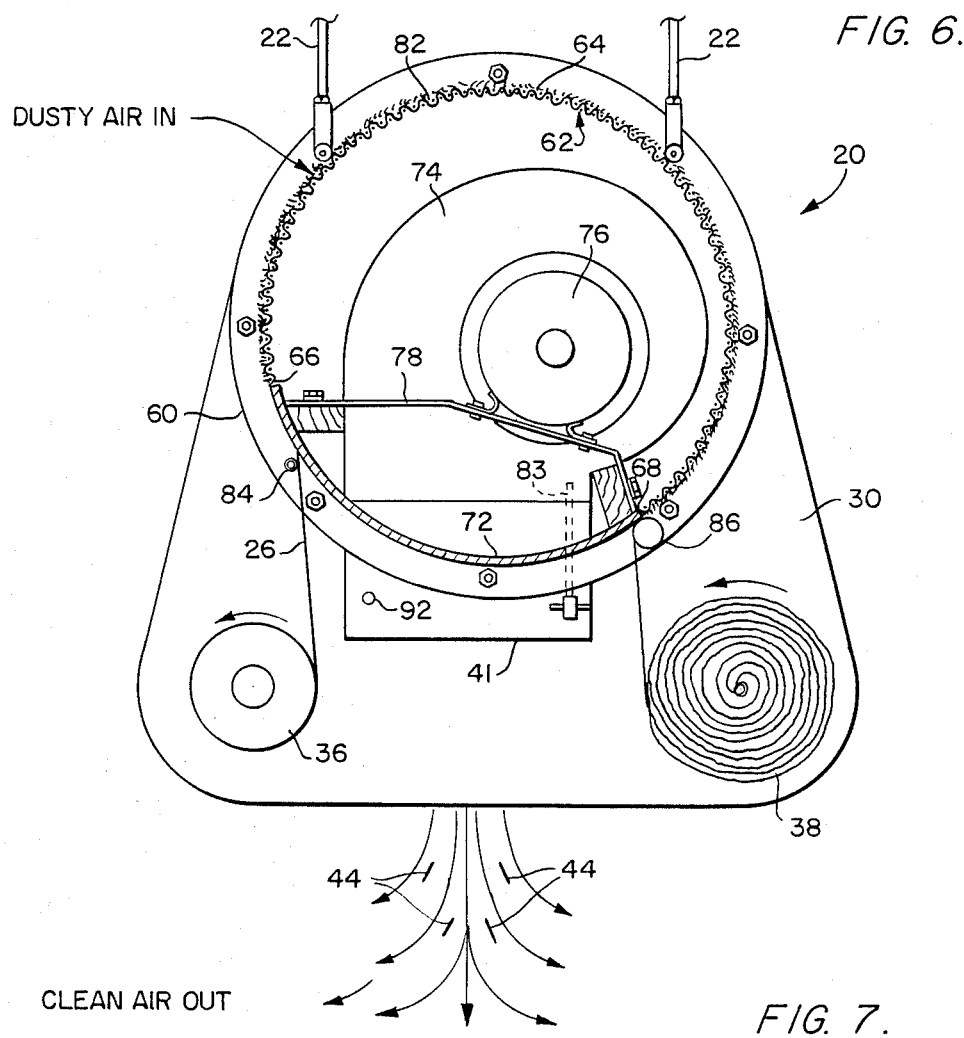

4,881,957

AIR FILTRATION UNITS AND METHODS EMPLOYING DUST AS FILTRATION MEDIA AND AIR FLOW RATE AS A DIRECTLY CONTROLLED PARAMETER

BACKGROUND OF THE INVENTION

The present invention relates generally to workplace air filtration systems and, more particularly, to a modular air filtration unit which employs local dilution ventilation. While the present invention was developed particularly in the context of a textile processing environment wherein objectionable respirable dust includes relatively small amounts of lint fragments and very small (e.g. 15 micron) dust particles, the invention is also applicable to dust control applications in general.

Increasing concern for the medical effects of airborne particulate, gaseous, and radioactive substances has caused industry to improve the quality of workplace air. An important general approach directed to this end is to employ what are commonly termed engineering controls. Examples of engineering controls are: (1) design and operation of production machinery so that unwanted emissions are minimized; (2) capturing the dust near the source(s) of emissions; and (3) utilizing general capture and dilution ventilation. Examples of other approaches are establishing work practices which minimize emissions or respiratory exposure, and requiring personal respiratory protection.

A commonly employed engineering control technique is the use of air filtration devices for the collection and removal of toxic substances. This is especially true for dust or other particulate matter. In general, filtration is required either to meet OSHA standards or industrial hygiene guidelines in the workplace or EPA standards for emissions into the atmosphere. Moreover, increasing energy costs make it increasingly necessary to recirculate workplace air. The alternative of continually bringing outside air into the workplace can be very costly where heating or cooling must be employed. The need for recirculation systems places increased demands on the filtration equipment since such equipment must be both more efficient and more reliable.

Filtration methods for collection and removal of particulate matter are well known in the art and generally fall into two categories: (1) central filtration and (2) modular filtration.

In a central filtration system, dust-laden air is captured or picked up by drawing it into suction duct work. The air is transported to a central filtration unit, such as a bag house or a drum filter, is cleaned, and is then recirculated back to the workplace, discharged into the atmosphere or, usually, a mixture of the two. Thus, to achieve air recirculation in a central filtration system, there must in general exist both collection duct work and return duct work. In some cases, the return duct work may be part of an air-conditioning system. In any case, the air flow rates are very high and energy losses within the duct work are a major fraction of the total energy required.

In a modular filtration system, to which the present invention is primarily directed, a major difference compared to central filtration systems is the elimination of the duct work such that workplace or machinery emissions are captured, filtered, and returned to a local area. This may be termed "local dilution ventilation". Thus, in one particularly useful embodiment of the broad concept of modular filtration, modular filtration units operate simply by generally capturing dusty room air and preferentially redistributing the clean, filtered air over the workers and/or machinery.

Modular filtration systems are known in the art and typically comprise a blower pulling dusty air into one or more stages of filter media and discharging the air back to the workplace. The media choice is influenced by the size, concentration, and type of dust. The media must be cleaned or discarded after loading up and thus leads to a high operating cost which increases with increasing dust capture rate.

Other dust collection systems are known, such as cyclones, scrubbers, and electrostatic precipitators. However, cyclones are ineffective and improper technology for respirable dust. Scrubbers are inapplicable to efficient modular filtration. Electrostatic precipitators are applicable to a restricted class of dusts, and in some explosion or fire-prone environments may not be employed at all.

As will be apparent from the description hereinafter, by the present invention relatively lower-cost, effective and efficient modular filtration units are provided. Considering cost for example, in 1983 the typical installed cost for high-quality central filtration, having discharge air quality similar to that provided by the present invention, is in the order of $4.00 per cubic foot per minute (CFM). For purposes of comparison, the installed cost for systems employing modular air filtration units of the present invention is in the order of $1.36 per CFM.

Moreover, operating costs for both types of system are dominated by the cost of electrical power to operate the blower motors, and the annual power cost per CFM of filtered air when employing modular air filtration units in accordance with the present invention is typically one-fourth that for central filtration. This is due not only to the fact that modular filtration inherently eliminates expensive losses associated with collection and return duct work, but also as a result of more efficient blower operation in accordance with control system aspects of the present invention.

More particularly, for purposes of illustration but not limitation, it is pertinent to consider two typical application areas in the textile industry.

First, it has heretofore been stated by many practitioners of engineering controls for cotton dust that there are no proven methods for controlling workplace respirable dust levels in certain processes, such as spinning, winding, or warping. The reason behind this statement is the extreme difficulty, indeed practical impossibility, of implementing source capture for such machines. For example, a spinning machine has perhaps 100 spindles turning at 12,000 RPM and liberating dust and fiber and respirable fiber fragments in an obviously general manner that defies source capture. In a warper, which comprises a large frame or creel holding several hundred rolls of yarn which are then pulled onto a long beam for subsequent weaving, the emissions problem is similarly general and inadmissable to source capture. General capture using the modular filtration units described herein has proven to be extremely effective, especially when an induced air flow pattern resulting from a high-velocity clean air discharge of the modular air filtration unit is used.

A second application area for modular filtration is to marginal areas which may already have engineering controls. A good example is carding, where dust is effectively removed from the aggressive action on individual fibers. These emissions must therefore be effectively contained either within the equipment or by source capture devices; otherwise, the workplace dust levels would be extremely high. Currently, almost all carding rooms have some type of dust capture system moving typically 500 to 2000 CFM per carding machine. In many applications having 500-1000 CFM, the workplace dust levels resulting from this dust control equipment were well under the former OSHA Standard of 1000 $\mu g/m^3$ and many of them had respirable dust levels in the range of 300 to 500 $\mu g/m^3$. (It may be noted that the workplace dust levels depend heavily upon the type of stock and the speed at which it is processed, as well as upon the performance of the dust capture system.)

The new Cotton Dust Standard [Dept. of Labor, OSHA. Occupational exposure to cotton dust. Federal Register, pp. 27350-27436, June 23, 1978] calls for a permissable exposure limit (PEL) in this process of 200 $\mu g/m^3$. The employer has already invested in dust capture and air filtration equipment and in air-conditioning equipment whose size is related to the filtration equipment. One option for the employer is to rip out a well-designed and properly-operating dust capture and air-conditioning system and install a much more expensive one operating at a much higher air flow. In many cases, this also necessitates upgrading or rebuilding the air-conditioning system. In accordance with the present invention, marginal processes such as summarized above can be brought into control simply by the addition of dilution ventilation via modular filtration.

Moreover, as illustrated next below, in some cases modular filtration designs can follow different design paths to accomplish respirable dust level reduction as the main objective. Alternatively stated, central filtration technology may be inapplicable or ineffective for respirable dust control as opposed to dust associated with waste-handling, the waste involved deriving from the fiber being processed.

In particular, respirable dust concentrations in the workplace generally obey, at equilibrium, $$\chi_{eq} \, \tilde{\alpha} \, \frac{\dot{M}_r}{Q}, \, \mu g/m^3 \quad (1)$$

where, $\dot{M}_r$ is the respirable dust emission rate in gm/min, and Q is the circulating, filtered air flow in $m^3$/min. $\chi_{eq}$ can be reduced only by reducing the respirable emissions $\dot{M}_r$ or by increasing the ventilating or diluting air flow, Q.

In some processes, for example carding, source capture can effectively reduce the $\dot{M}_r$ component from machinery emissions. In other processes, especially from spinning through warping, source capture is not practical, as has been recognized in the Cotton Dust Standard and as briefly mentioned above. In these processes the only engineering control measure is increased dilution ventilation, which generally captures the airborne dust and recirculates filtered air to the workplace.

It is most important to appreciate the magnitude of $\dot{M}_r$ by a simple but realistic example. In a process area with Q=35,310 CFM=1,000 $m^3$/min and $\chi_{eq}$=350 $\mu g/m^3$, $$\dot{M}_r = Q\chi_{eq} = 10^3 \, m^3/min \times 350 \times 10^{-6} \, gm/m^3 \quad (2)$$
$$= 0.35 \, gm/min = 21 \, gm/hr = 0.046 \, pounds/hr.$$

In other words, a quantity of respirable dust small enough to be contained within a salt shaker (21 grams) of respirable dust emitted each hour into a textile workplace having 35,310 CFM of circulating air is responsible for the 350 $\mu g/m^3$ respirable dust concentration. If half this small amount of respirable dust could be captured, then the workplace dust concentrations would drop by half, from 350 to 175 $\mu g/m^3$, and the workplace would be placed in compliance with the 200 $\mu g/m^3$ OSHA PEL.

For contrast, consider a dust collection and filtration system serving carding machinery. If the 35,310 CFM is supplied by an air washer to the workplace and all this air is returned to the air washer by being drawn into a dust collection system serving 35 cards processing 60 pounds per hour and removing approximately 2% of dust, trash, and other wastes, then the 35,310 CFM must transport away a waste component mass $$\dot{M}_w = 35 \times 60 \text{\#/hr} \times 454 \frac{gm}{\#} \times 0.02 = 19,068 \, gm/hr \quad (3)$$

or 19,068/21=908 times as much waste mass per hour as is responsible for the 350 $\mu g/m^3$ workplace respirable dust concentration.

It is an underlying recognition of the present invention that the technologies for respirable dust control and for process dust control should be vastly different because (1) the mass emission rates and (2) the particle sizes are vastly different, by orders of magnitude. It is a misapplication of technology to expect that central filtration, which can well handle large quantities of large particles, can effectively and generally apply to the control of micron-sized respirable dust, in grams per hour quantities.

SUMMARY OF THE INVENTION

Accordingly, it is an object of the invention to provide an efficient and cost-effective modular filtration system.

It is another object of the invention to provide a modular filtration unit which properly employs dust itself as its own filtration medium to achieve highly efficient and low-cost operation, in combination with either low-cost disposable filter substrate media or with cleanable-filter substrate media.

It is another object of the invention to provide a modular filtration unit which operates in a cotton processing environment and which properly employs lint fragments and dust particles to form a highly efficient medium for respirable dust.

It is another object of the invention to optimally maintain electromechanical efficiency of a motor-blower combination employed to draw air through the filter medium.

It is yet another object of the invention to provide a modular air filtration unit which effectively avoids "short-circuiting" wherein clean filtered air is wastefully drawn right back into the filtration unit.

It is another object of the invention to provide a modular air filtration unit which facilitates the inducement of a preferred air flow pattern aiding in the general collection of dust emitted from processing machinery or work activity.

It is yet another object of the invention to provide esthetically pleasing and easily mountable modular air filtration units.

Briefly, and in accordance with an overall concept of the invention, a modular filtration system is provided for optimally and cost-effectively using collected dust to enhance the air filtration unit of the unit. Measurements in connection with the present invention, employing the continuous aerosol monitor (CAM) electro-optical method described in commonly-assigned Shofner et al U.S. Pat. No. 4,249,244, have established that fiber fragments, which are ever-present in textile operations, constitute one of man's oldest and best filters. By properly building a lint mat from these ever-present fiber fragments in textile operations, and the word "properly" must be emphasized, an extremely efficient filter medium for respirable dust can be developed. Inasmuch as the collection efficiency of the filter substrate media on which the fiber fragments and respirable dust are captured is virtually insignificant, an important aspect of the invention is the utilization of relatively thin, inexpensive filter substrate media to hold the dust, which then becomes its own filter. In previous filter systems, it has been common to improperly form lint mats, with the result that either the respirable dust penetration is highly unsatisfactory, or the air flow is severely limited.

An important aspect of the invention is the use of air flow rate as the controlled parameter, rather than static pressure developed across a filter element as is common in the prior art. Filter element area remains essentially constant, while the rate of filter substrate media cleaning or filter substrate movement is controlled as required to maintain a predetermined air flow rate. For reasons developed in detail below, this control approach has a number of significant advantages. In particular, the electromechanical efficiency of the motor-blower combination is optimally maintained. The air flow rate can be set to whatever level is required for the particular application depending upon the dust level to be maintained. Within the range of operating conditions of the invention, the rate of filter substrate media consumption depends directly on the amount of lint and dust removed from the air.

Another overall aspect of the invention is the use of a relatively high-velocity discharge, in the order of 3000 feet per minute. This high-velocity discharge may be employed either with or without an air diffuser. The high-velocity discharge permits "throwing" the clean-filtered air to preferable workplace areas, and prevents the usual wasteful short-circuiting or recirculation of clean air. This high velocity discharge moreover enables inducement of a preferred air flow pattern which aids the general collection of dust emitted from processing machinery or work activity.

Other general aspects of the invention lie in the mechanical aspects which, in general, involve cylindrical drums formed at least in part of rigid open mesh material such as expanded metal which remains stationary while filter substrate media is controllably drawn thereacross. The filter substrate media may either be a disposable media, in which case the filter substrate media is provided in elongated web form as applied from a feed roller. Alternatively, a cleanable filter media may be employed.

Another aspect of the invention is an improved cleaning system for removing accumulated mat material from a cleanable filter substrate.

Briefly, and in accordance with a more specific aspect of the invention, there is provided a modular air filtration unit comprising a unit housing formed at least in part of a rigid open mesh material, such as ordinary expanded metal, defining an air flow inlet. The expanded metal also serves as a media support element. In one form, the expanded metal portion is a semi-cylindrical shell, with the remaining portion of the cylinder completed by solid, air-impermeable metal. In another specific embodiment, the expanded metal shell is substantially completely cylindrical, with the exception of a single axially-extending solid strip of limited circumferential extent which comprises a portion of filter substrate media cleaning system, described hereinbelow.

The modular air filtration unit additionally includes a motor-driven blower for drawing air into the housing through the expanded metal material and for forcibly discharging the air from the housing through a blower outlet. In the one embodiment, the air is forcibly discharged in a radial direction. In the other embodiment wherein the expanded metal media support extends substantially all the way around the cylindrical housing, the blower discharge is in an axial direction.

A sheet of filter substrate media is positioned on the outside of the expanded metal mesh, and is supported thereby such that unfiltered air is drawn through the filter substrate media to form a mat thereon, and such that the mat thus formed serves as a filtration medium. In the one specific embodiment, a disposable filter substrate media is employed, and extends between a media supply roll and a media take-up roll, both oriented generally parallel to the axis of the housing. The web extends from the supply roll to the take-up roll across the outside of the media support portion and such that air can enter the housing only through the filter substrate media. In the other embodiment, a cylindrical sleeve of cleanable filter substrate media, such as the material known in the art as "fake fur", is positioned on the outside of the cylindrical shell and supported thereby.

The filtration unit additionally includes a controllable media-replenishment device for drawing exposed filter substrate media across and off the expanded metal mesh at one portion thereof and simultaneously supplying clean filter substrate media at another portion of the rigid open mesh. In the case of the one embodiment wherein a disposable filter substrate media is employed, the media-replenishment device comprises quite simply the aforementioned rolls, together with a controllable drive motor for rotating the take-up roll. Accordingly, when the controllable drive motor is rotated, exposed filter substrate media is drawn across and from the expanded metal portion, while at the same time clean filter substrate media is drawn from the supply roll. In the other specific embodiment, the controllable media replenishment device comprises a filter substrate cleaning system including a controllable drive mechanism for rotating the cylindrical sleeve relative to the cylindrical shell. The media cleaning system further comprises the above-mentioned axially-extending solid strip of limited circumferential extent, and this axially-extending solid strip serves to locally block air flow. An axially-extending slot is formed in the solid strip, and a conduit is provided for directing compressed air radially outwardly through the slot to aid in removing accumulated mat. Finally, an axially-extending suction nozzle is positioned over the cylindrical sleeve immediately over the slot for aiding in removing and carrying away accumulated mat.

The final overall element of the modular air filtration unit is a control system responsive to the rate of air flow through the unit and operable to substantially maintain a predetermined rate of air flow by activating the media replenishment device when sensed air flow decreases.

As stated above, and as further explained in detail hereinbelow, a significant and advantageous aspect of the invention is that the rate of air flow is user-selectable in accordance with the requirements of the particular environment within which the modular air filtration unit is operated. Accordingly, the control system is user-adjustable. As a result, the mat permeability, motor-power consumption, and substrate media usage rate are each indirectly selected as a direct function of air flow rate. In addition, dust mat filter density and dust mat filter efficiency are each indirectly selected as an inverse function of air flow rate.

As stated hereinabove, an important aspect of the invention is to properly form a dust mat or combination lint and dust mat filter which then serves as its own filter medium, with emphasis on the "properly". In accordance with the invention, this involves controlling the air flow rate such that the permeability of the mat filter is no greater than in the order of 200 cubic feet per minute (CFM) per square foot of open area at a static pressure drop of 2 inches water column (WC). Lower permeability corresponds to better filtration and lower media consumption, but increases the physical size of the apparatus for a given flow. Clearly, an optimum must be determined and, in accordance with the invention, a value of in the order of 3450 CFM through about 18 square feet of expanded metal is good. Thus, the air flow control approach, which then indirectly controls the permeability of the dust mat is intimately tied to the formation of a proper dust mat. At this point it should be noted that the resistance of the filter substrate media is very low, relative to the dust mat, and that its capture efficiency for microdust is also very low.

In accordance with the invention, it has been quantitatively discovered, using the CAM monitor system of the above-identified Shofner et al U.S. Pat. No. 4,249,244, that a lint mat in a textile processing application, and dust mats in general, can in fact be good filters, coupled with a combination lint mat and flow control approach optimally applicable to modular filtration.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 4 is another highly-schematic view depicting the FIG. 1 unit employed to control dust from a warping machine, and wherein no diffuser is employed such that a straight-line, high velocity clean air discharge induces an air flow pattern;

FIG. 5 is yet another highly-schematic view depicting the FIG. 1 unit employed in a partial source capture mode and applied to a drawing operation;

FIG. 6 is a cross-sectional view taken on line VI—VI of FIG. 1;

FIG. 7 is a side elevational view taken on line VII—VII of FIG. 1 depicting the structure with the filter substrate media removed;

DETAILED DESCRIPTION OF THE PREFERRED EMBODIMENTS

Installation in General

Figure 1:
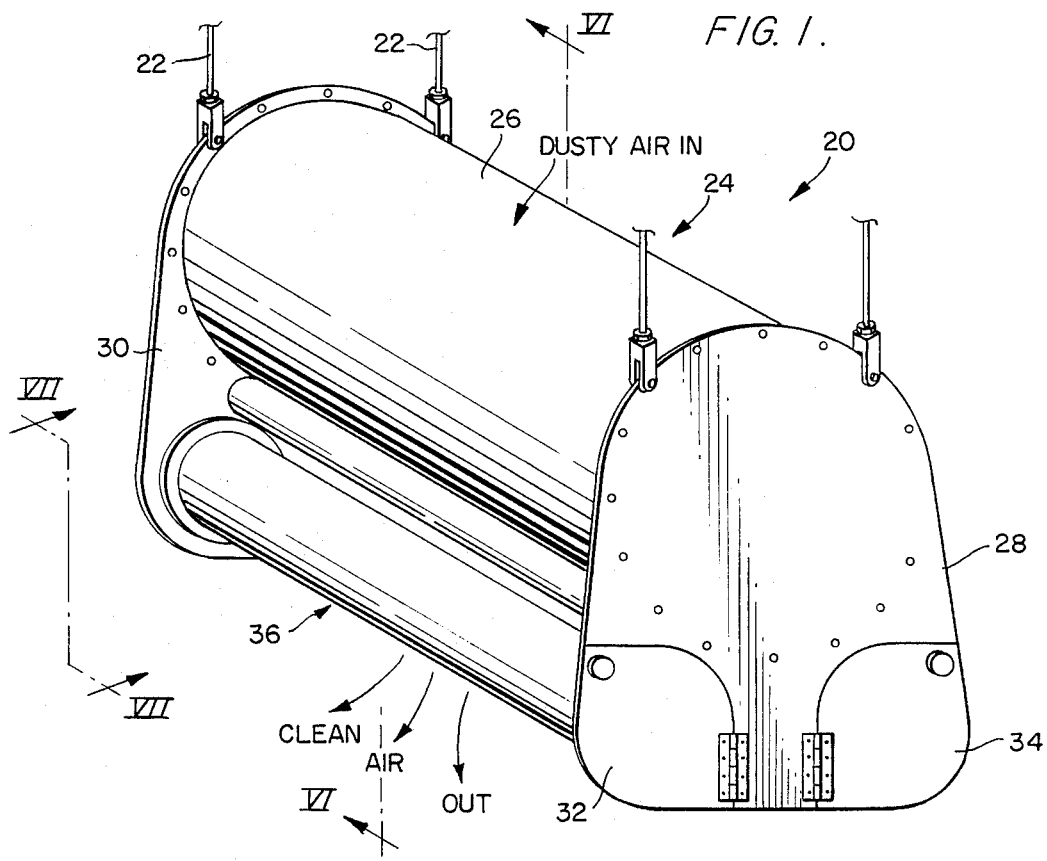
FIG. 1 is an overall perspective view of a modular filter unit in accordance with a first embodiment of the invention intended for textile processing applications and oriented for vertically downward clean air discharge and generally showing the air inlet portion of the unit.
Figure 2:
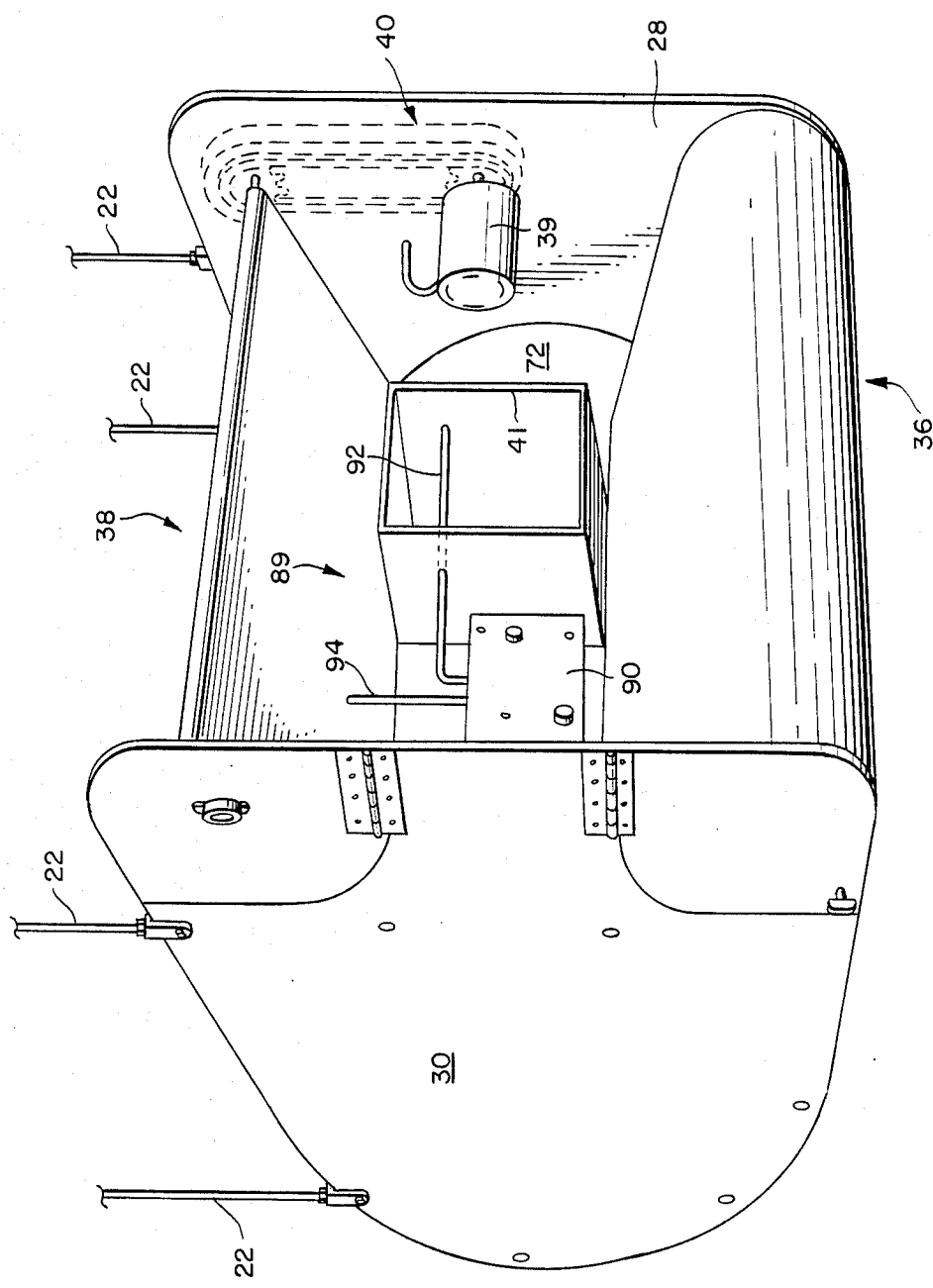
FIG. 2 is another overall perspective view of the FIG. 1 unit oriented for horizontal clean air discharge and generally showing the air outlet portion of the unit.

With reference first to FIGS. 1 and 2, shown in overall perspective view is a single modular air filtration unit 20 in accordance with the invention intended particularly for use in textile processing applications. The particular unit 20 illustrated is intended for mounting by suspension from a ceiling by means of suitable suspension rods 22. From a comparison of FIGS. 1 and 2, it can be seen that unit 20 can be oriented in a variety of ways by varying the mounting. In particular, in FIG. 1 the unit 20 is oriented for vertically downward clean air discharge, and in FIG. 2 the unit 20 is oriented for horizontal clean air discharge. By way of example, the particular unit 20 has overall dimensions of 45 inches in length, 40 inches in height, and 40 inches in width. Typical applications of the modular air filtration unit 20 involve multiple units, with each unit 20 covering in the order of 500 to 2000 square feet of floor area. The air discharge rate is in the order of 3450 CFM, at a velocity of in the order of 3000 feet per minute. A 1.5 or 2 HP 3-phase blower motor is employed.

In overall configuration, the modular air filtration unit 20 comprises an esthetically pleasing cylindrical portion, generally designated 24 and partly or fully covered with filter media 26, extending between end plates 28 and 30, which also serve to terminate the mounting rods 22. Doors 32 and 34 are provided for respectively providing access to a media supply roll 36 and a media take-up roll 38. Also visible in FIG. 2 is a media drive arrangement comprising a high torque gear motor 39 which rotates the media take-up roll 38 through a chain drive 40 when energized.

In the overall operation, dusty air is drawn in through the cylindrical portion as depicted in FIG. 1, and is forcibly discharged through a blower outlet 41, shown in FIG. 2.

Figure 3:
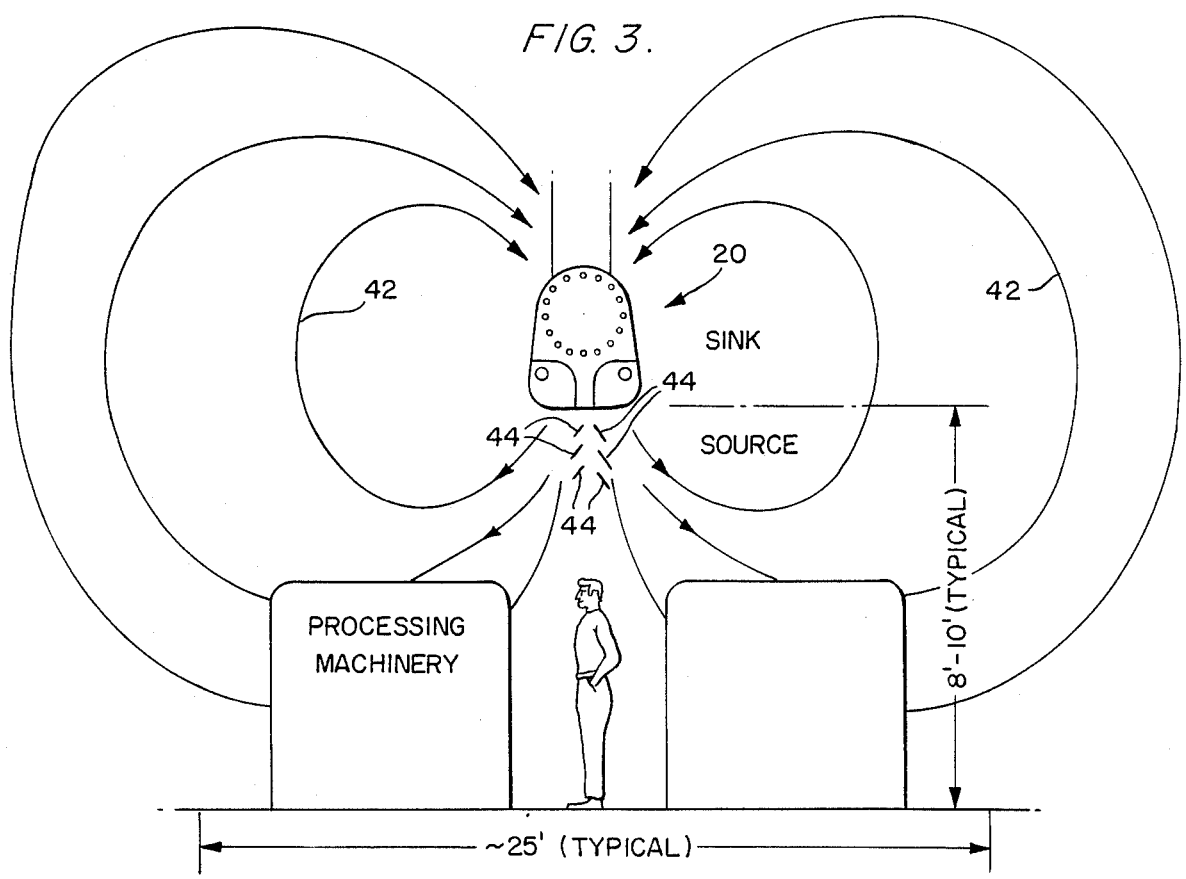
FIG. 3 is a highly-schematic view depicting the FIG. 1 unit employed in an application involving general dilution dust control employing an air diffuser.

FIGS. 3, 4 and 5 respectively depict typical and various applications for the modular air filtration unit 20.

FIG. 3 illustrates the use of the unit 20 in a general dilution mode with a localized air flow pattern, as indicated by arrows 42, around the unit 20, and which indicate that minimal "short-circuiting" occurs. The flow pattern depicted in FIG. 3 is achieved by a combination of relatively high discharge velocity and an air diffuser, schematically depicted in cross-section as vanes 44. A "source-sink" characteristic is evident.

FIG. 4 depicts a modular air filtration unit without a diffuser operating in an induced flow pattern in connection with a warping machine 48. The "source-sink" characteristics of the unit 20 occasioned by the high-velocity air flow are also apparent from FIG. 4. In general, a high-velocity, e.g. 3000 feet per minute, flow of air as generally represented at 50 is directed over the warping machine 48, and is then drawn back through the warper 48 as depicted at 52. In some applications, a wall 54 aids in redirecting the air flow back through the machine 48. It will be appreciated that a warping machine 48 has an inherent air flow pattern caused by yarn entrainment of air, and in such cases the modular air filtration unit of the invention aids this inherent air flow pattern. As a result, larger floor areas can be served by each modular air filtration unit 20 than might otherwise be the case.

More particularly, roughly, floor space areas of 500 to 2000 square feet can be covered by each unit 20. However, this is highly application-dependent. To achieve a better estimate requires that various factors be taken into account, such as existing dust concentration, target dust concentration, existing air change rates, machinery dust emission rates, quality of air supply by other sources (e.g., air-conditioning, filter houses, etc.), and inherent air flow patterns, especially cross-flows from adjacent processes. As a very rough rule of thumb, 30% reductions are typically effected by modular air filtration units in accordance with the invention each serving about 1000 square feet of floor area.

Referring next to FIG. 5, the modular air filtration unit 20 is employed in a partial source capture mode, particularly exploiting the sink feature of the unit 20. As is known, it is always better to capture dust before it spreads. Some machinery, such as draw frames, spinning end collection boxes, winders, and some spoolers, can have their discharges ducted generally toward, but not hard connected into, the modular air filtration unit 20. In FIG. 5, this principle is exemplified by a lint screen discharge duct 50.

MECHANICAL FEATURES

FIGS. 6 and 7 depict the internal construction of the unit 20, FIG. 6 being substantially complete, and FIG. 7 having a number of elements removed for clarity of illustration.

The air filtration unit 20 comprises a unit housing, generally designated 60, comprising the end plates 28 and 30 and an at least semi-cylindrical shell 62 including a semi-cylindrical inlet and media support portion 64 formed of rigid open mesh material, such as expanded metal, with a pair of axially-extending boundaries 66 and 68. In the FIG. 6 view, the expanded metal portion 64 extends clockwise from the axially-extending boundary 66 at approximately the eight o'clock position clockwise around to the boundary 68 at approximately the four o'clock position. The remainder of the shell 62 generally comprises solid material 72, a portion of which is also visible in FIG. 2.

Within the housing 60 is a squirrel cage blower 74 driven by an AC induction motor 76, for example, 1.5 or 2.0 HP. For compact size, the blower motor 76 is preferably a three-phase motor. A suitable mounting arrangement 78 supports the blower motor 76. As may be best seen in FIG. 7, the motor 76 has an extended shaft such that air axially enters the blower 74 from two sides.

The blower 74 serves to draw air into the housing 60 through the expanded metal mesh material 64 and to forcibly discharge the air through the blower outlet 41. The blower outlet 41 is rectangular in cross-section, having cross-sectional dimensions in the order of 12×13 inches.

In FIG. 6 it may be seen that the web 26 of filter substrate media extends from the supply roll 36 generally across the outside of the expanded metal media support portion 64 to be tightly wound up on the motor-driven take-up roll 38. A gear-driven high-torque motor 39 (FIG. 2) drives the take-up roll 38 as required by the flow-control system.

FIG. 6 also depicts a lint mat 82 which is formed on the filter substrate media 26 from the lint and particle matter itself. The microdust filtration properties of this filter mat 82 are exceptionally good because, at least for textile processing application, the ever-present fiber fragments are small and numerous and effectively capture and retain microdust particles. As approximate examples of the sizes involved, the fiber fragments of interest are roughly 0.5 mm to 5 mm in length, and 3 $\mu$m to 30 $\mu$m in width. It may be noted that cotton fibers from which the fragments are formed are about 25 mm in length, and 20 $\mu$m to 30 $\mu$m in average diameter. The microdust particles are roughly spherical and have diameters of 15 $\mu$m and smaller, for OSHA-defined, respirable cotton dust. The permeability of the filter mat 82, when properly formed, is in the order of 200 CFM per ft$^2$ of open area at a static pressure drop of 2 inches WC.

The filter substrate media 26 comprises a non-woven rayon fabric material having a high machine direction strength such that it can withstand the significant forces required to pull it around the metal mesh cylinder 64 against the friction forces caused by static pressure drop across the media 26 plus lint mat 82. This media 26 preferably comprises a non-woven rayon fiber material having a pore size smaller than about 1 mm and a permeability in the order of 200 CFM per square foot of open area at a static pressure drop of about 0.1 inches WC. The weight is only about 1.5 to 2.0 ounces per square yard. As hereinbefore stated, the filtration properties of the substrate media are immaterial; the media 26 serves only to capture the lint which constitutes the microdust filter.

Suitable non-woven materials are well-known for other purposes and are employed, for example, for apparel purposes and men's collar linings, and as other apparel linings. Exemplary materials are available from J.P. Stevens and Co., Inc., High Point, N.C.; for example, J.P. Stevens Style Nos. MF-210 (1.5 oz. per square yard) and MF-710 (1.9 oz. per square yard). The material is employed in 45 inch wide rolls, with a length in the order of 220 yards. These materials, while intended for use for other purposes, i.e. apparel, are adequate for use in the subject invention. It is anticipated that improvements to the material (e.g. higher machine direction strength and lower weight) will be made in the future in view of the specific requirements of the subject invention.

In connection with the comparative permeability of the media substrate material 26 (200 CFM per ft² of open area at a static pressure drop of 0.1 inch WC) and of the filter mat 82 (200 CFM per ft² of open area at a static pressure drop of 2 inch WC), for start-up purposes a manually-operated damper 83 is included to restrict air flow through the unit 20 until the lint mat 82 is formed. (See FIGS. 6 and 9.) Otherwise, the airflow exceeds the rated capacity of the blower 74, causing the motor 76 to draw in excess of its rated current.

An idler bar 84 and a ball-bearing idler roll 86 direct the substrate media 26 such that the expanded metal portion 64 is always completely covered, to avoid leakage of air around the filter medium comprising the mat 82 supported on the substrate media 26.

As stated above, the exposed media 26 is tightly wound up onto the take-up roll 38 driven by the high-torque gear motor 39 and chain drive 40. The tight winding permits typical "doff" intervals of about three months. A new roll of media typically lasts about twelve months, but this is highly-application dependent, as will be seen from the discussion of operating parameters below.

Figure 9:
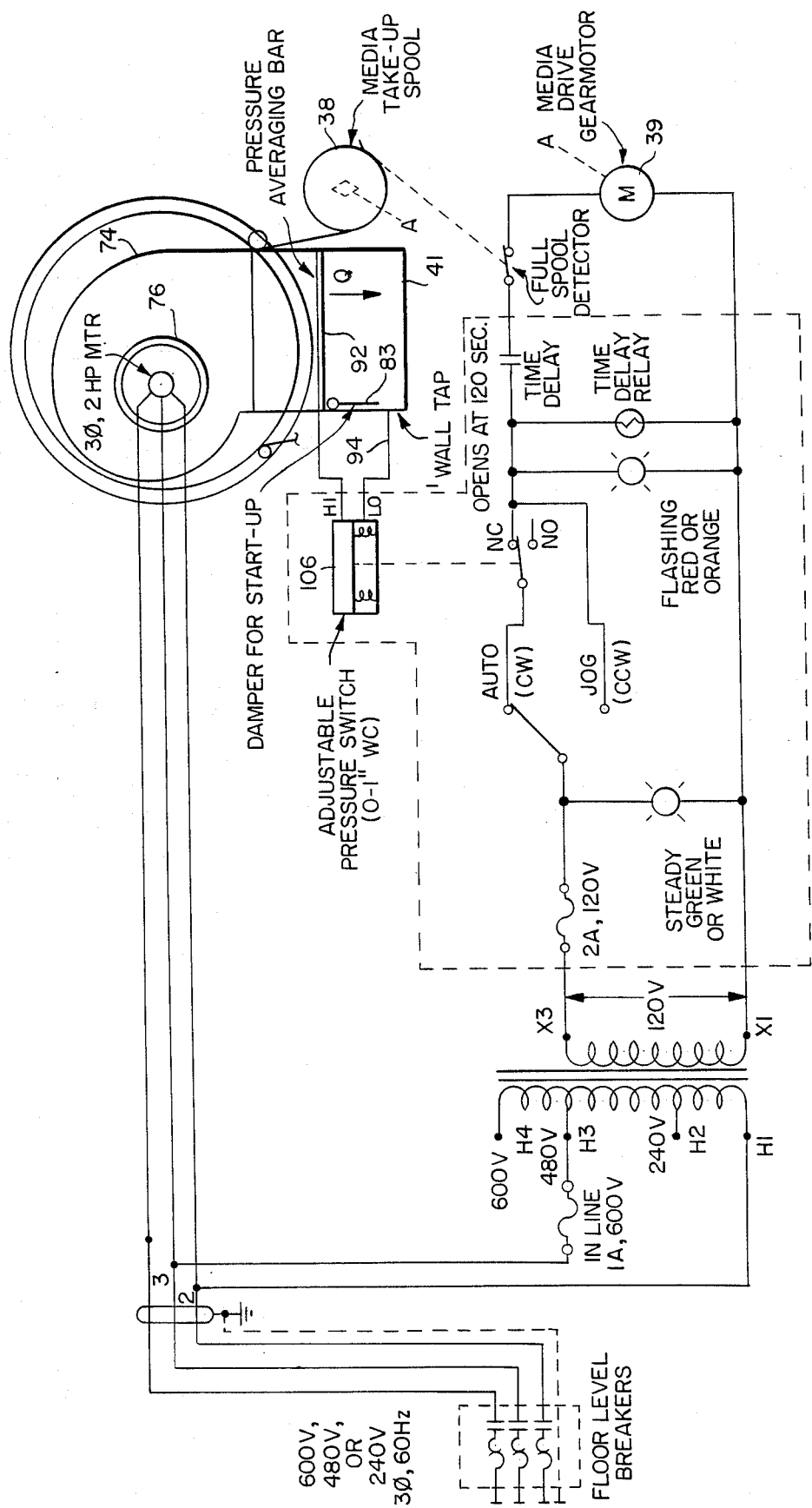
FIG. 9 is an electrical schematic diagram of the control systems of the FIG. 1 unit.

The final major element of the unit 20 is a control system, generally designated 89, and including a portion enclosed within a control box 90, and an airflow sensor 92 (FIG. 2). The control system 89 comprises essentially an adjustable pressure switch, the electrical function of which is depicted in FIG. 9, described hereinafter. More particularly, the pressure sensor 92 comprises a closed-end tube having a plurality of upstream-directed apertures (not shown) facing into the discharge air stream from the blower outlet 41 such that pressure within the tube is a direct function of flow rate. Since airflow is not constant at different points within the cross-section of the blower outlet, the particular form of pressure sensor 92 employed in effect averages or integrates air flow along a line, to provide a more accurate measurement. Thus, the sensor may be termed an "integrating bar", although other shapes may be employed, such as integrating loops. Static pressure for reference purposes is sensed by an open-end tube 94.

Figure 8:
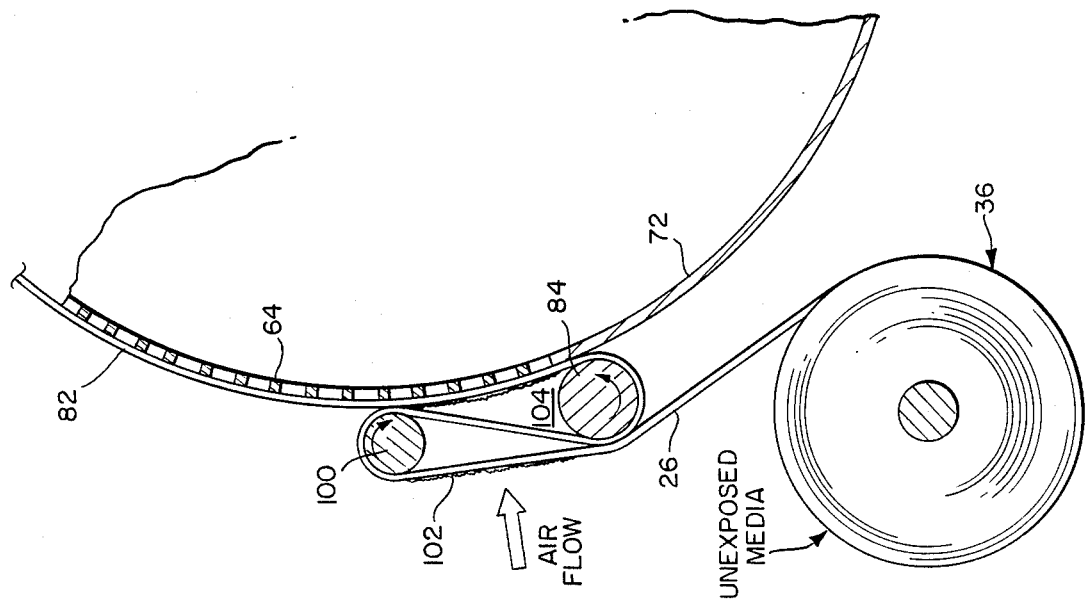
FIG. 8 is an enlarged cross-sectional view depicting an arrangement for pre-exposure mat formation.

FIG. 8 depicts a modification for pre-exposure dust mat formation. In particular, the FIG. 8 embodiment includes an additional idler roller 100 arranged such that the filter substrate media 26 is constrained to follow an S-bend. As a result, dust is collected and forms a pre-exposure cake or mat 102 so that better microdust filtration is realized at 104 and at 82.

FIG. 9 depicts the overall electrical schematic wiring diagram of the unit 20 including, in particular, an adjustable pressure switch 106 included within the FIG. 2 control box 90 for periodically energizing the media drive gear motor 39 when air flow falls below a predetermined rate. In typical operation, the media drive gear motor 39 is energized approximately once per hour, and advances about three lineal inches of fresh media substrate 26 before air flow increases sufficiently to re-open the pressure switch 106.

In operation, since the static pressure developed across the lint mat 82 is essentially constant at about 2 inches WC, it follows that flow through the unit 20 is determined by the permeability of the lint mat. A major advantage of the control approach is that flow, once set, is a known and dependable quantity and that the consumption of media is in proportion to that amount of lint and dust which needs to be removed.

Alternatively stated, one of the most powerful features of the modular air filtration unit 20 is this ability to set just the flow required to achieve certain dust levels in the workplace. If the stock is cleaner, or production is lower, or the production or air-handling machinery emit less dust, the modular air filtration unit 20 airflow can be simply decreased with the result that electrical power, media consumption and dust concentration out of the modular air filtration unit 20 are all decreased.

Since the units 20 of the invention tend to be associated with specific processing machines, the ability to adjust the dilution ventilation rate influencing dust levels around those machines is a very flexible feature.

OPERATING PARAMETER INTERRELATIONSHIPS

The dependences of media consumption, electrical power consumption, and discharge air quality upon the controlled parameter, filter airflow Q, are now described.

Figure 10:
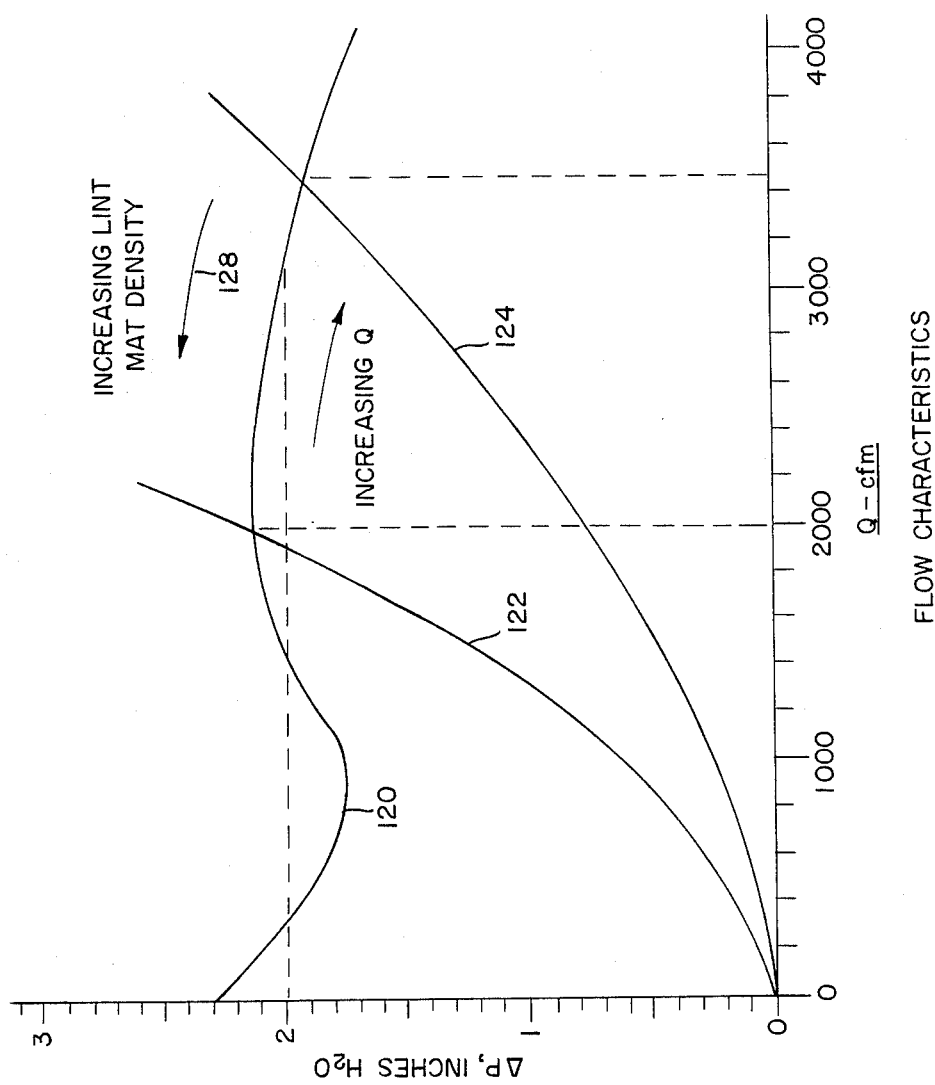
FIG. 10 is a graph depicting blower performance characteristics.

Some of these relationships may be better understood in view of the plots of FIG. 10. In FIG. 10, the line 120 depicts a blower static pressure characteristic curve. What is significant to note is that blower static pressure is approximately constant over the useful CFM range of the unit. The two lines 122 and 124 depict pressure drop as a function of airflow for two different representative lint mat densities, the curve 122 representative of a relatively lower permeability lint mat, and the line 124 representative of a relatively higher permeability lint mat.

1. Media Consumption. In general, static pressure drop Δp across flat, low face velocity filter media obeys, for a given type of dust and media, $$\Delta p \propto \overline{H} V^2 \qquad (4)$$

where $\overline{H}$ is the average surface density of dust held onto the media in grams/m² and V is air velocity in m/sec. (Evidently, $\overline{H}$ at a point on the media varies from zero to some maximum value as the media is drawn around the drum. We can express the major operational parameter dependances in terms of the average holding capacity $\overline{H}$.) But Q=VA, where A=modular air filtration unit open area 64, and Δp=constant ≈2" WC for a typical unit. It follows that $$\overline{H} \propto Q^{-2} \qquad (5)$$

or the higher the flow, the thinner the lint mat, as shown by the trend arrow 128 in FIG. 10.

Now the mass of lint and dust in the lint mat $M = \overline{H}A$; since $\overline{H}$=constant (because Δp and Q are constant), $$\frac{\partial A}{\partial t} = \frac{1}{\overline{H}} \frac{\partial M}{\partial t} \qquad (6)$$

or $$\dot{A} \propto \frac{1}{\overline{H}} \dot{M} \qquad (7)$$

Using Equation (5) we finally have $$\dot{A} \propto \dot{M} Q^2 \qquad (8)$$

which shows that media consumption is directly proportional to the amount of lint and dust captured, $\dot{M}$. The dependence of $\dot{A}$ on $Q^2$ is significant. Relative to 3000 CFM, media consumption on a given dust is 32% higher at maximum flow of 3450 and 56% lower at 2000 CFM, or $\dot{A}$ covers a 3:1 range over the nominal MF operating range.

2. Electrical Power Consumption. Since the static pressure $\Delta p$ and electro-mechanical conversion efficiency for the modular air filtration unit 20 are approximately constant over the 2000–3450 CFM range, it follows that $$\text{Electrical Power Costs} \propto Q \tag{9}$$

The total operating costs for any filtration system must include media, repair parts, maintenance labor, and electrical power. Electrical power dominates. In the modular air filtration unit 20 2 HP delivers 3450 CFM of 25 $\mu g/m^3$ air. Such high quality air cannot be produced with the typical central filtration system designed primarily for waste handling; the technology is inapplicable and 50–100 $\mu g/m^3$ is considered very good. When high efficiency central filtration systems are designed to deliver such good air quality, it is typical to find a 75 HP motor driving a 35,310 CFM blower. Thus the electrical power operating cost ratio is $$\frac{\text{Subject Modular}}{\text{Central}} = \frac{2 \text{ HP}/3{,}450 \text{ CFM}}{75 \text{ HP}/35{,}310 \text{ CFM}} = 0.27 \tag{10}$$

or about 4:1 favor of the modular air filtration unit. A more detailed operating cost analysis preserves this 4:1 advantage.

3. Discharge Air Quality. The residual dust concentration in the modular unit discharge $X_{MF}$ should depend inversely on $\overline{H}$, the lint mat density. This is expected to be the primary factor but we also expect slight dependences on $\dot{A}$. At present there are not sufficient data to conclude the exact form of these dependences because all of the units installed to date have operated at constant flows. However, it can be stated that the range and typical values observed are $$X_{MF} : \; 7 \text{ to } 40 \; \mu g/m^3 \text{ range;} \tag{11}$$
$$25 \; \mu g/m^3, \text{ typically}$$

4. Dust Concentration Transient Analysis. Next is presented a simplified analysis to support the discussion of a practical modular filter performance evaluation protocol using PCAM dust test equipment. Shofner et al [F. M. Shofner, A. C. Miller, Jr., G. Kreikebaum, "Measurement and Control of Non-Cotton Dust Contributions in the Cotton Processing Workplace: I-$\chi_{at}$" presented at the ASME Symposium on Cotton Dust, Oct. 7–8, 1980, Atlanta] show that equilibrium respirable workplace dust concentrations obey $$\chi_{eq} = \frac{\dot{M}_r}{Q(1-F)} \tag{12}$$

where F is the penetration efficiency of dust in a test cubic meter of air upon one complete recirculation path, and $M_r$ and Q are as above for Equation (1). (In order to focus on the major parameters, the (1-F) term was omitted from Equation (1)). F therefore includes all losses. Typically, for good filtration, $F \sim 0.1$ to 0.2. We assume the same penetration for all circulating flows in order to more simply show the major effects.

Figure 11:
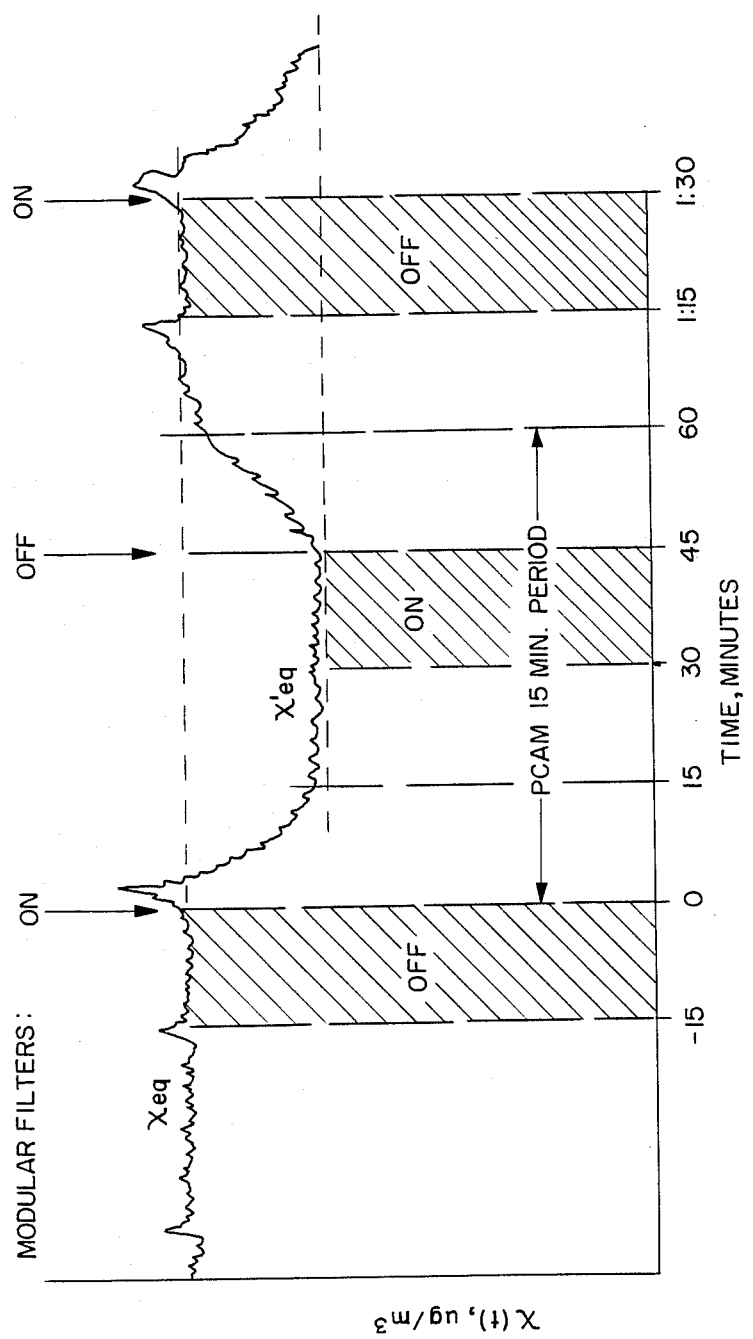
FIG. 11 is a graph depicting the transient behavior of workplace respirable dust concentrations when modular filters are turned ON and OFF over a period in the order of one hour.

FIG. 11 shows the transient behavior of workplace respirable dust concentrations when modular filters are turned ON and OFF over a period of the order of one hour. This period is short enough that machinery and processing conditions should remain constant, and that intense observations by test personnel can assure it, and long enough that equilibrium conditions are reasonably reached. The 15 minute PCAM averaging periods are ideal for this type evaluation. (For a PCAM test protocol for modular filter evaluation see J. H. Hanley, F. M. Shofner, "Application of Modular Filtration to Cost-Effective Cotton Dust Control in Textile Processes; Especially in Spinning through Warping", presented at and published in the Proceedings of the Seventh Cotton Dust Research Conference, 1983 Beltwide Cotton Production Research Conferences, San Antonio, Tex., Jan. 3–4, 1983.)

As a matter of analytical interest, noting the assumption above and several further simplifying assumptions, including perfect and immediate mixing of machinery dust emissions, then $\chi(t)$ may be expressed, for the OFF$\rightarrow$ON transient as an exponential decay from equilibrium concentration $\chi_{eq}$, with modular filters OFF, to a new equilibrium $\chi_{eq}'$, with modular filters ON, according to $$\chi(t) = \frac{\dot{M}_r}{(Q + Q_{MF})(1-F)} \left(1 + \frac{Q_{MF}}{Q} e^{-t/\tau}\right) \tag{13}$$

wherein
$\dot{M}_r$ = total respirable emissions into workplace, gm/min
$Q$ = existing circular air flow, $m^3$/min
$Q_{MF}$ = Modular unit circulating air flow, in $m^3$/min
$F$ = net penetration efficiency for all circulation and filtration sources
$t$ = time after modular unit is turned ON, in minutes
$\tau$ = time constant, minutes.

The decay time constant $\tau$ is related to the traditional room air exchange time $$T = \frac{\text{Room Volume, } m^3}{Q, \; m^3/\text{min}}, \text{ minutes.} \tag{14}$$

60/T is the customary air changes per hour.

Thus if a room has 15 changes per hour, T=4 minutes, and in about 15 minutes, the major part of the transient is complete.

Note that the fractional reduction in dust levels as a consequence of turning the modular unit ON is $$R = \frac{\chi_{eq} - \chi'_{eq}}{\chi_{eq}} = \frac{Q_{MF}}{Q + Q_{MF}} \tag{15}$$

For example, for a 33% reduction in dust levels, the added modular unit flow $Q_{MF}$ must be half the existing, effective circulating flow, Q.

A similar expression holds for the OFF$\rightarrow$ON transition. Note that $\tau_{ON}$ and $\tau_{OFF}$ are different.

Performance Examples

The following TABLE is a Case Study Summary summarizing the performance of experimental prototype units in accordance with the invention in representative textile processes. These particular units delivered about 2500 CFM. Induced flow patterns were employed in warping and carding; general dilution was employed elsewhere.

TABLE
CASE STUDY SUMMARY

| Process | $\chi_{eq}^1$, $\mu g/m^3$ Without MF's | $\chi_{eq}^1$, $\mu g/m^3$ With MF's | Observed Reduction R | Predicted Reduction R | $\chi_{in}^2$ $\mu g/m^3$ | $\chi_{out}^3$ $\mu g/m^3$ | MF Coverage $Ft^2$/MF | Estimated Media Consumption $Ft^2$/Day | Comments |
|---|---|---|---|---|---|---|---|---|---|
| Warping | 396 | 175 | 56% | — | 690 | 25 | 1063 | 14.8 | Large atomizer component. Nominal air changes |
| Carding | 266 | 183 | 31% | 45% | 509 | 16 | 625 | 8.5 | Large variation in $\chi$, both without and with MF's $\chi_{AC} \sim 80\ \mu g/m^3$ |
| Drawing | 510 | 335 | 34% | 40% (max) | 758 | 30 | 500 | 9.7 | Definite crossflow. Unusual diffusers. Large emission from frames. $\chi_{AC} \sim\ \mu g/m^3$ |
| Waste Baling | 669 | 431 | 36% | — | 1466 | — | ? | 15.7 | Unusual layout |
| Back Winding | 109 | 73 | 35% | — | — | — | >1050 | — | 2 units in corner of large room. Cross flows. |

$^1\chi_{eq}$ = respirable workplace dust at equilibrium
$^2\chi_{in}$ = total dust concentration onto modular filter unit
$^3\chi_{out}$ = respirable dust concentration out, as isokinetically sampled with PCAM
$^4$At $\Delta p_1$ = 1.2" H$_0$. Nominal $\Delta p_1$ now 1.9" H$_2$O for MF3450.

Alternative Embodiment

The foregoing descriptions with reference to FIGS. 1-11, which generally are illustrative of the principles of the invention, are specifically for textile processing applications, wherein the lint and dust mat, when properly formed, constitutes an excellent dust filter. However, as noted in the background, the amount of respirable dust that must be removed for engineering controls of the textile workplace is small, of the order of tens of grams per hour. In typical installations, even this low collection rate is distributed over several modular filters.

There are numerous other applications where the permissible exposure limits are higher. Nuisance dust (as opposed to toxic dust) PEL's are of the order of 5 to 15 mg/m$^3$. It follows that the dust collection rate is much higher for such applications and that the concept of disposable media can, in some cases, become economically unattractive.

Figure 12:
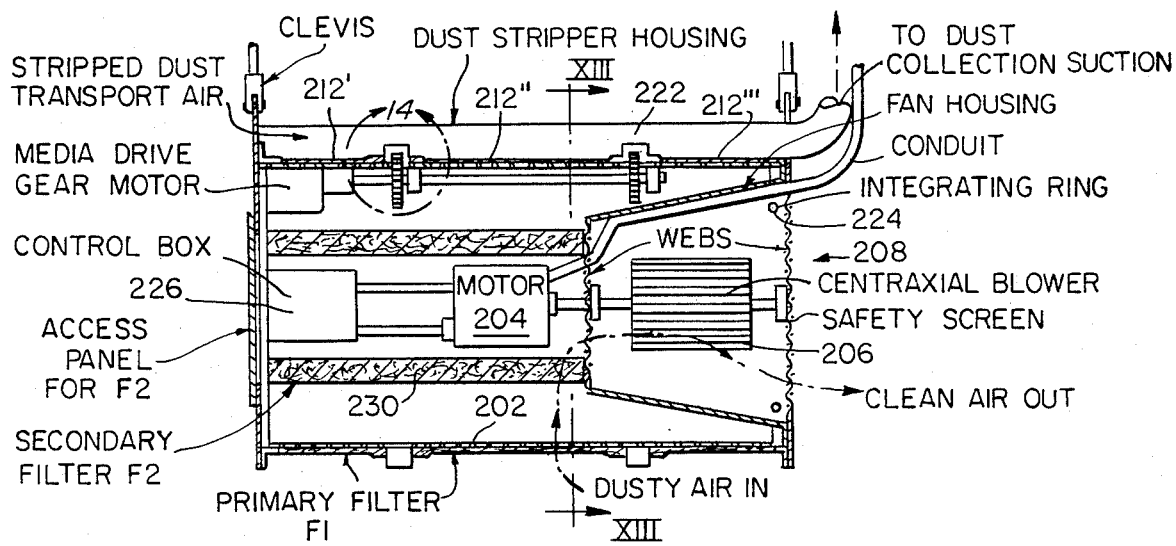
FIG. 12 is a side cross-section view of a second embodiment of the invention for general purpose use in high dust concentration applications.
Figure 13:
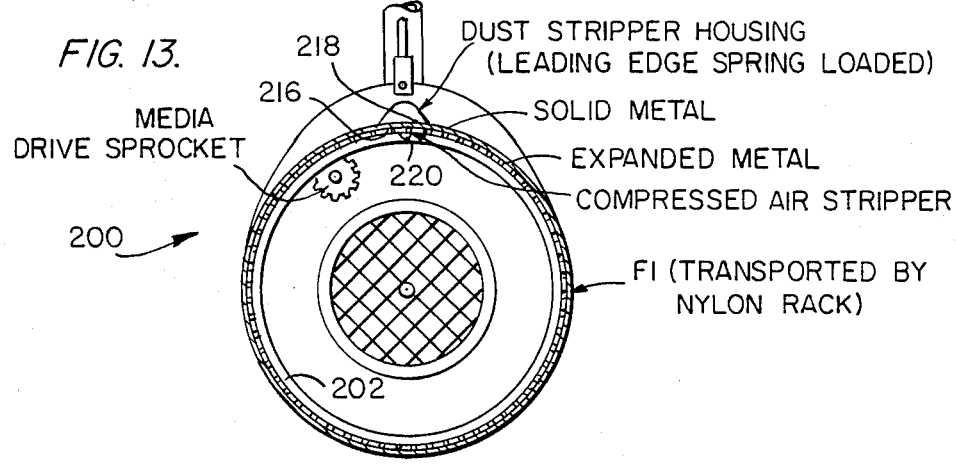
FIG. 13 is a cross-sectional view taken on line XIII—XIII of FIG. 12.

All of the major features of the apparatus described above are retained in a modular air filtration unit 200 designed for high dust concentration applications as shown in FIGS. 12 and 13. The unit 200 includes a cylindrical shell 202 formed of rigid open mesh material, such as expanded material as in the previous embodiments. A motor 204 and centraxial blower 206 combination is provided for drawing air into the housing 202 through the cylindrical shell and for forcibly discharging the air from the housing through an axially-directed blower outlet 208.

Rather than the disposable filter substrate media as employed in the embodiment described above, the filtration unit 200 of FIGS. 12 and 13 employs a cleanable filter substrate media 210, comprising, for example, a material known in the filtration art as "fake fur". The filter substrate media 210 is configured into a cylindrical sleeve configuration and is positioned on the outside of the cylindrical shell 202 and supported thereby such that unfiltered air is drawn through the filter substrate media 210 to form a dust mat thereon, and such that the dust mat thus formed serves as a filtration medium. The substrate media 210 and the dust mat formed together comprise a primary filter F1.

The unit 200 includes a filter substrate media cleaning system. More particularly, the cleaning system comprises a controllable drive mechanism for rotating the cylindrical sleeve 210 relative to the cylindrical shell 202.

In connection with the drive mechanism, it may be noted that the filter substrate media 210 actually comprises three individual sleeve segments 212', 212", and 212''' attached at their circumferential edges to band-like nylon racks 214 rotated by a gear and media drive arrangement.

The filter substrate media 210 is cleaned by a combination of compressed air and suction. To accomplish this, a portion of the cylindrical sleeve comprises an axially-extending solid strip 216 (FIG. 13) of limited circumferential extent for locally blocking radially inward airflow. An axially-extending slot 218 is provided in the axially-extending strip, and a conduit 220 directs compressed air radially outwardly through the slot to aid in removing accumulated mat from the filter substrate media 210. In addition, an axially-suction nozzle 222 is positioned over the cylndrical sleeve 202 immediately over the slot 220 for aiding in removing and carrying away accumulated mat.

Airflow is sensed by an integrating ring 224 positioned at the blower outlet 208. The integrating ring 224 is similar in operation to the integrating bar of the previous embodiment, and comprises a tube with a plurality of apertures (not shown) pointing upstream such that static pressure builds in the tube dependent upon airflow velocity. The integrating ring 224 is connected to a control box 226 by means of a conduit (not shown). The control box 226 is comparable to the control box 90 of FIG. 2, and comprises an adjustable pressure switch 106 as in FIG. 9.

Figure 14:
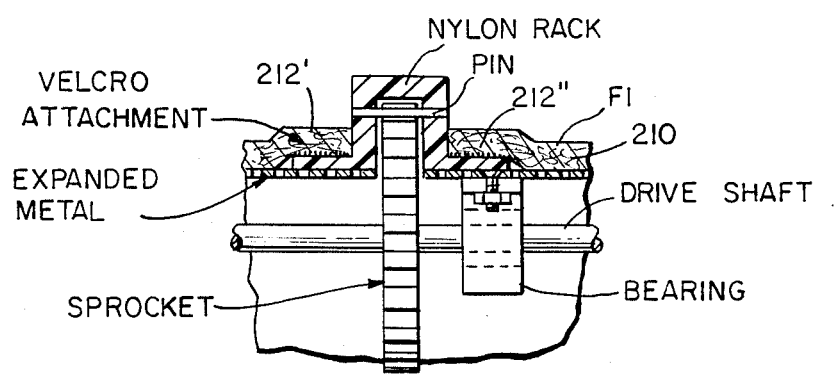
FIG. 14 is a greatly-enlarged view of a portion of FIG. 12.

The same control approach is applied to the modular air filtration unit 200 of FIGS. 12-14 as in the previous embodiment. The rate of airflow through the unit 200 is sensed, and the media 210 is advanced and thereby cleaned in response to the airflow velocity. As before, user-selection of a particular velocity indirectly determines a particular permeability because the blower static pressure is approximately constant over the useful CFM range from the unit.

The economics of increased capital cost for the unit 200 intended for high dust concentration applications are off-set by its lower operating costs relative to media consumption. The selection of either the disposable filter substrate media embodiment 20 or the cleanable filter substrate media embodiment 200 is determined through a trade-off between capital costs and operating costs.

As in the previous embodiments, the axial flow from the centraxial blower 206 is a directed high-velocity flow, and retains the high kinetic energy along through distance of the previous embodiment. As may be seen from the drawings, it utilizes a direct-drive motor, thus eliminating mechanical energy losses inherent in belt-drive designs.

In a 200 $\mu g/m^3$ PEL process, it is important that the discharge having concentration $\lesssim 25$ $\mu g/m^3$. In a 15 mg/m$^3$ = 15,000 $\mu g/m^3$ process, the requirements on discharge air quality are obviously much less stringent. However, in those processes where the discharge is important, a secondary set of cleanable or disposable filters 230 or F2, may be inserted as shown in FIG. 12.

These F2 filters may be z-folded, axi-folded, and in some critical applications, HEPA media. Clearly, the choice of secondary filter media is more application dependent than the choice of the primary filter F1 because the primary filter serves to capture dust which, in sufficient quantity and when properly formed, forms its own filter media.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An air filtration unit comprising:
   a unit housing formed at least in part of a rigid open mesh material defining an airflow inlet;
   a motor-driven blower for drawing air into said housing through said rigid open mesh material and for forcibly discharging the air from said housing through a blower outlet;
   a sheet of filter substrate media positioned on the outside of said rigid open mesh and supported thereby such that unfiltered air is drawn through said filter substrate media to thus expose said filter substrate media and form a mat thereon, and such that a mat thus formed serves as a filtration medium;
   a controllable media-replenishment device connected to said sheet of filter substrate media for drawing exposed filter substrate media across and off said rigid open mesh at one portion thereof and simultaneously supplying clean filter substrate media at another portion of said rigid open mesh; and
   control system means connected to said media-replenishment device and responsive to the rate of airflow through said unit for substantially maintaining a predetermined rate of airflow through said media by activating said media replenishment device when sensed airflow decreases;
   said control system means including means for maintaining an airflow rate such that the permeability of the mat filter is in the order of 200 CFM per ft$^2$ of open area at a static pressure drop of 2 inches WC.

2. An air filtration unit as set forth in claim 1, wherein said control system means includes a user adjustment means for selecting a particular airflow rate to be maintained in accordance with the requirements of the environment within which said unit is operated, whereby the mat permeability, motor power consumption and substrate media usage rate are each indirectly selected as a direct function of airflow rate, and whereby the dust mat filter density and dust mat filter efficiency are each indirectly selected as inverse functions of airflow rate.

3. An air filtration unit in accordance with claim 2, wherein said filter substrate media comprises a nonwoven rayon fiber material having a pore size of one millimeter or smaller and a permeability in the order of 200 CFM per ft$^2$ of open area at a static pressure drop of 0.1 inches WC.

4. An air filtration unit in accordance with claim 1, wherein said filter substrate media comprises a nonwoven rayon fiber material having a pore size of one millimeter or smaller and a permeability in the order of 200 CFM per ft$^2$ of open area at a static pressure drop of 0.1 inches WC.

5. An air filtration unit comprising:
   a unit housing including at least a semi-cylindrical shell including a semi-cylindrical inlet and media support portion formed of rigid open mesh material having a pair of axially-extended boundaries;
   a motor-driven blower for drawing air into said housing through said rigid open mesh material and for forcibly discharging the air from said housing through a blower outlet;
   a filter substrate media supply roll and a filter substrate media take-up roll oriented generally parallel to the axis of said housing and positioned generally adjacent to respective ones of said media support portion boundaries;
   a web of filter substrate media extending from said supply roll across the outside of said media support portion to said take-up roll such that unfiltered air is drawn through said filter substrate media to thus expose said filter substrate media and form a mat thereon, and such that the mat thus formed serves as a filtration medium;
   a controllable take-up roll drive motor for rotating said take-up roll to draw exposed filter substrate media across said media support portion onto said take-up roll and to simultaneously draw clean filter substrate media from said supply roll onto said media support portion; and
   control system means connected to said controllable drive motor and responsive to the rate of airflow through said unit for substantially maintaining a predetermined rate of airflow through said media by activating said take-up roll drive motor when sensed airflow decreases, and said control system includes means for maintaining an airflow rate such that the permeability of the mat formed on the filter substrate media is in the order of 200 CFM per ft$^2$ of open area at a static pressure drop of 2 inches WC.

6. An air filtration unit in accordance with claim 5, wherein said control system means includes a user adjustment means for selecting a particular airflow rate to be maintained in accordance with the requirements of the environment within which said unit is operated, whereby the mat permeability, motor power consumption and substrate media usage rate are each indirectly selected as a direct function of airflow rate, and whereby the dust mat filter density and dust mat filter efficiency are each indirectly selected as inverse functions of airflow rate.

7. An air filtration unit in accordance with claim 5, wherein said filter substrate media comprises a nonwoven rayon fiber material having a pore size smaller than one millimeter and a permeability of in the order of 200 CFM per $ft^2$ of open area at a static pressure drop of 0.1 inches WC.

8. A method for operating an air filtration unit including an opening defining an airflow passage, a motor-driven blower for drawing air through the opening and forcibly discharging the air, a sheet of filter substrate media supported over the opening such that unfiltered air is drawn through the filter substrate media to form a mat thereon and such that the mat thus formed serves as a filtration medium, and a controllable media-replenishment device for drawing exposed filter substrate media across and off the opening at one portion thereof and simultaneously supplying clean filter substrate media at another portion of the opening, said method comprising:

providing said air filtration unit;
sensing the rate of airflow through the opening; and
activating the media-replenishment device when sensed airflow decreases to substantially maintain a predetermined rate of airflow, and controlling the airflow rate such that the permeability of the mat filter is in the order of 200 CFM per $ft^2$ of open area at a static pressure drop of 2 inches WC.

9. A method in accordance with claim 8, which further comprises selecting a particular airflow rate to be maintained in accordance with the requirements of the environment within which the unit is operated, whereby the mat permeability, motor power consumption and substrate media usage rate are each indirectly selected as a direct function of airflow rate, and whereby the dust mat filter density and dust mat filter efficiency are each indirectly selected as inverse functions of airflow rate.

10. An air filtration unit comprising:
a unit housing including a cylindrical shell formed of a rigid open mesh material;
a motor-driven blower for drawing air into said housing through said cylinder shell and for forcibly discharging the air from said housing through an axially-directed blower outlet;
a cylindrical sleeve of cleanable filter substrate media positioned on the outside of said cylindrical shell and supported thereby such that unfiltered air is drawn through said filter substrate media to form a mat thereon, and such that the mat thus formed serves as a filtration medium;
a filter substrate media cleaning system including:
a controllable drive mechanism for rotating said cylindrical sleeve relative to said cylindrical shell;
an axially-extending solid strip of limited circumferential extent for locally blocking airflow;
an axially-extending slot in said solid strip, and a conduit for directing compressed air radially outwardly through said slot to aid in removing accumulated mat;
an axially-extending suction nozzle positioned over said cylindrical sleeve immediately over said slot for aiding in removing and carrying away accumulated mat; and
control system means connected to said media-replenishment device and responsive to the rate of airflow through said unit for substantially maintaining and operable to substantially maintain a predetermined rate of airflow through said media by activating said filter substrate media cleaning system when sensed airflow decreases, said control system means includes means for maintaining an airflow rate such that the permeability of the mat filter is in the order of 200 CFM per $ft^2$ of open area at a static pressure drop of 2 inches WC.

11. An air filtration unit in accordance with claim 10, wherein said control system is user-adjustable for selecting a particular airflow rate to be maintained in accordance with the requirements of the environment within which said unit is operated whereby the mat permeability motor power consumption and substrate media usage rate are each indirectly selected as a direct function of airflow rate, and whereby the dust mat filter density and dust mat filter efficiency are each indirectly selected as inverse functions of airflow rate.

12. An air filtration unit in accordance with claim 9, wherein said filter substrate media comprises fake fur.

* * * * *